United States Patent
Renegar

(10) Patent No.: US 11,354,753 B1
(45) Date of Patent: Jun. 7, 2022

(54) SYSTEM FOR RECONCILING PHARMACY PAYMENTS BASED UPON PREDICTED CLAIMS AND RELATED METHODS

(71) Applicant: INMAR Rx SOLUTIONS, INC., Ft. Worth, TX (US)

(72) Inventor: Larry Scott Renegar, Clemmons, NC (US)

(73) Assignee: INMAR RX SOLUTIONS, INC., Ft. Worth, TX (US)

(*) Notice: Subject to any disclaimer, the term of this patent is extended or adjusted under 35 U.S.C. 154(b) by 156 days.

(21) Appl. No.: 16/238,939

(22) Filed: Jan. 3, 2019

(51) Int. Cl.
*G06Q 40/00* (2012.01)
*G06N 20/00* (2019.01)

(52) U.S. Cl.
CPC .............. *G06Q 40/12* (2013.12); *G06N 20/00* (2019.01)

(58) Field of Classification Search
CPC ...... F41A 5/18; F41A 3/26; F41A 3/66; F41A 3/72; F41A 15/14
See application file for complete search history.

(56) References Cited

U.S. PATENT DOCUMENTS

| | | | | |
|---|---|---|---|---|
| 5,550,734 A * | 8/1996 | Tarter | ..................... | G06Q 40/02 705/2 |
| 8,065,162 B1 * | 11/2011 | Curry | ..................... | G06Q 10/10 705/2 |
| 8,121,864 B2 * | 2/2012 | Green | ..................... | G16H 40/20 705/3 |
| 8,332,238 B1 * | 12/2012 | Allen | ..................... | G06Q 40/02 705/2 |
| 8,364,498 B2 * | 1/2013 | Sohr | ..................... | G06Q 10/10 705/40 |
| 8,447,627 B1 * | 5/2013 | Cruise | ..................... | G06Q 40/08 705/2 |
| 8,457,992 B1 * | 6/2013 | Harding | ..................... | G06Q 40/08 705/35 |
| 8,639,596 B2 * | 1/2014 | Chew | ..................... | G06Q 40/00 705/30 |

(Continued)

OTHER PUBLICATIONS https://www.ibm.com/topics/edi-electronic-data-interchange#:~:text=EDI%2C%20which%20stands%20for%20electronic,as%20purchase%20orders%20or%20invoices. Accessed Nov. 3, 2021 (Year: 2018).*

(Continued)

*Primary Examiner* — Ashford S Hayles
(74) *Attorney, Agent, or Firm* — Allen, Dyer, Doppelt + Gilchrist, P.A. Attorneys at Law

(57) ABSTRACT

A system for reconciling pharmacy payments may include pharmacy devices, each associated with a respective pharmacy generating respective pharmacy claims, and provider payment devices, each generating a paper log of payment data associated with payment of the pharmacy claims. A pharmacy payment reconciliation device may generate and store electronic historical records of payment data based upon user entry from the paper log of payment data, and determine a predicted claim for a current pharmacy payment based upon the stored electronic historical records. The pharmacy payment reconciliation device may display the predicted claim in a field for user entry of a corresponding current payment, and accept user confirmation or correction of the predicted claim in the field for user entry of the corresponding current payment to thereby assist the user in entry from the paper log of payment data.

11 Claims, 4 Drawing Sheets

(56) References Cited

U.S. PATENT DOCUMENTS

| | | | | |
|---|---|---|---|---|
| RE44,748 E * | 2/2014 | Allen | ...................... | G06Q 40/08 709/200 |
| 8,781,850 B2 * | 7/2014 | Bazzani | ................. | G06Q 40/00 705/2 |
| 9,934,361 B2 * | 4/2018 | Yao | ......................... | G16H 50/70 |
| 10,311,412 B1 * | 6/2019 | Josephs | ................ | G06Q 20/023 |
| 10,586,019 B1 * | 3/2020 | Dowling | .............. | G06Q 20/145 |
| 10,599,813 B2 * | 3/2020 | Davis | ..................... | G06Q 40/08 |
| 2001/0037216 A1 * | 11/2001 | Oscar | ..................... | G06Q 40/08 705/2 |
| 2003/0069760 A1 * | 4/2003 | Gelber | .................... | G06Q 10/10 705/2 |
| 2004/0054685 A1 * | 3/2004 | Rahn | ...................... | G06Q 40/08 707/999.102 |
| 2005/0010446 A1 * | 1/2005 | Lash | ....................... | G06Q 40/08 705/2 |
| 2005/0043972 A1 * | 2/2005 | Kossol | .................... | G06Q 40/08 705/4 |
| 2005/0261944 A1 * | 11/2005 | Rosenberger | ........... | G06Q 40/08 705/2 |
| 2006/0010016 A1 * | 1/2006 | Kossol | .................... | G06Q 40/08 705/4 |
| 2007/0005403 A1 * | 1/2007 | Kennedy | ................. | G16H 40/20 705/3 |
| 2007/0136100 A1 * | 6/2007 | Daugherty | ............. | G06Q 10/10 705/3 |
| 2007/0228146 A1 * | 10/2007 | Rogers | ................... | G06Q 10/10 705/2 |
| 2007/0265887 A1 * | 11/2007 | McLaughlin | ........... | G16H 40/20 705/2 |
| 2008/0033750 A1 * | 2/2008 | Burriss | ................... | G06Q 10/10 705/2 |
| 2009/0030821 A1 * | 1/2009 | Stegman | ................ | G06Q 10/10 705/34 |
| 2009/0138277 A1 * | 5/2009 | Warren | .................. | G06Q 10/10 705/2 |
| 2009/0164243 A1 * | 6/2009 | Zubak | .................... | G16H 40/67 705/2 |
| 2010/0138243 A1 * | 6/2010 | Carroll | ................... | G06Q 40/08 705/4 |
| 2011/0010189 A1 * | 1/2011 | Dean | ...................... | G06Q 40/12 705/2 |
| 2011/0258004 A1 * | 10/2011 | Dean | ...................... | G06Q 10/10 705/4 |
| 2011/0301979 A1 * | 12/2011 | Wester | ................... | G06Q 40/08 707/769 |
| 2012/0022887 A1 * | 1/2012 | Chiappe | ................. | G06Q 30/04 705/2 |
| 2012/0166212 A1 * | 6/2012 | Campbell | .............. | G16H 40/20 705/2 |
| 2013/0054259 A1 * | 2/2013 | Wojtusiak | .............. | G06Q 10/10 705/2 |
| 2013/0096952 A1 * | 4/2013 | Beery | ..................... | G06Q 40/08 705/3 |
| 2013/0159017 A1 * | 6/2013 | Burkholder | ............ | G06Q 10/10 705/3 |
| 2013/0246090 A1 * | 9/2013 | Hoffman | ................ | G06Q 40/08 705/2 |
| 2014/0006061 A1 * | 1/2014 | Watanabe | .............. | G06Q 40/08 705/4 |
| 2014/0039905 A1 * | 2/2014 | Stamper | ................. | G16H 40/67 705/2 |
| 2014/0039920 A1 * | 2/2014 | Nadai | ................... | G06Q 10/087 705/2 |
| 2014/0074762 A1 * | 3/2014 | Campbell | .............. | G06Q 40/00 706/46 |
| 2014/0081652 A1 * | 3/2014 | Klindworth | ............ | G06Q 40/08 705/2 |
| 2014/0088989 A1 * | 3/2014 | Krishnapuram | ........ | G16H 50/50 705/2 |
| 2014/0088999 A1 * | 3/2014 | Davis | .................... | G06Q 20/102 705/2 |
| 2014/0143075 A1 * | 5/2014 | Eason, Jr. | ............ | G06Q 20/322 705/17 |
| 2015/0081324 A1 * | 3/2015 | Adjaoute | ................ | G06Q 40/08 705/2 |
| 2015/0120561 A1 * | 4/2015 | Ver Hulst | .............. | G06Q 40/02 705/44 |
| 2015/0178454 A1 * | 6/2015 | Brown | ................... | G16H 40/20 705/4 |
| 2017/0329910 A1 * | 11/2017 | Selwanes | ............... | G06Q 30/06 |
| 2018/0075192 A1 * | 3/2018 | Sethumadhavan | ..... | G06F 16/20 |
| 2018/0075558 A1 * | 3/2018 | Hill, Sr. | .................. | G16H 20/10 |
| 2018/0089379 A1 * | 3/2018 | Collins | .............. | G06Q 10/1057 |
| 2018/0189332 A1 * | 7/2018 | Asher | ..................... | G06N 5/022 |
| 2018/0247376 A1 * | 8/2018 | Sharma | ................. | G06Q 40/08 |
| 2018/0349776 A1 * | 12/2018 | Raamadhurai | ....... | G06K 9/6219 |
| 2019/0012733 A1 * | 1/2019 | Gorman | ................. | G06Q 40/12 |
| 2019/0115100 A1 * | 4/2019 | Madonna | ............... | G16H 40/20 |
| 2019/0251058 A1 * | 8/2019 | Robinson | ............. | G06K 9/6201 |
| 2019/0279242 A1 * | 9/2019 | Welch, Jr. | .......... | G06Q 30/0222 |
| 2019/0304021 A1 * | 10/2019 | Rutherford | ............ | G16H 10/60 |
| 2019/0371438 A1 * | 12/2019 | Chintamaneni | ........ | G16H 40/20 |
| 2019/0378094 A1 * | 12/2019 | Quinn | .................... | G06N 20/00 |
| 2019/0385722 A1 * | 12/2019 | Wiley, II | ................ | G16H 40/20 |
| 2020/0005921 A1 * | 1/2020 | Hill, Sr. | ................. | G16H 10/60 |
| 2020/0012980 A1 * | 1/2020 | Li | .......................... | G06N 5/025 |
| 2020/0058381 A1 * | 2/2020 | Patel | ..................... | G16H 10/60 |
| 2020/0152303 A1 * | 5/2020 | Hibbert-Iacobacci | ..................... G06Q 10/10 |

OTHER PUBLICATIONS

Grover, Dhruv, Sebastian Bauhoff, and Jed Friedman. "Using Supervised Learning to Select Audit Targets in Performance-Based Financing in Health: An Example from Zambia." PloS one 14.1 (2019): e0211262-e0211262. Web. (Year: 2019).*

B. Nithya and V. Ilango, "Predictive analytics in health care using machine learning tools and techniques," 2017 International Conference on Intelligent Computing and Control Systems (ICICCS), 2017, pp. 492-499, doi: 10.1109/ICCONS.2017.8250771. (Year: 2017).*

J. J. -C. Ying, P. -Y. Huang, C. -K. Chang and D. -L. Yang, "A preliminary study on deep learning for predicting social insurance payment behavior," 2017 IEEE International Conference on Big Data (Big Data), 2017, pp. 1866-1875, doi: 10.1109/BigData.2017. 8258131. (Year: 2017).*

\* cited by examiner

SYSTEM FOR RECONCILING PHARMACY PAYMENTS BASED UPON PREDICTED CLAIMS AND RELATED METHODS

TECHNICAL FIELD

The present invention relates to the field of electronics, and more particularly, to reconciliation of pharmacy payments and related methods.

BACKGROUND

A pharmacy typically fills and provides prescriptions or medical related services to patients. If a patient has insurance, for example, the pharmacy typically submits a claim against the user's insurance company for payment of prescription or medication or medical related services.

A third party may manage or reconcile claims and corresponding payments on behalf of a pharmacy. For example, a third party may provide reconciliation reports to the pharmacy as to which claims were paid or not paid, and/or how much was paid relative to the submitted claim.

In many instances, third party management of pharmacy payments involves the manual remittance data capture. In other words, the payment and claim details may be manually entered and matched. This may be relatively expensive in terms of resources and may introduce an increased number of errors.

SUMMARY

A system for reconciling pharmacy payments may include a plurality of pharmacy devices, each associated with a respective pharmacy and configured to generate respective pharmacy claims, and a plurality of provider payment devices, each configured to generate a paper log of payment data associated with payment of the pharmacy claims. A pharmacy payment reconciliation device may be configured to generate and store electronic historical records of payment data based upon user entry from the paper log of payment data, and determine a current predicted claim for at least one pharmacy payment based upon the stored electronic historical records of payment data. The pharmacy payment reconciliation device may also be configured to display the predicted claim in a field for user entry of a corresponding current payment, and accept one of user confirmation or correction of the predicted claim in the field for user entry of the corresponding current payment to thereby assist the user in entry from the paper log of payment data.

The pharmacy payment reconciliation device may include a processor and a memory cooperating therewith. The pharmacy payment reconciliation server may further include a user input device cooperating with the processor. The pharmacy payment reconciliation device may also include a display cooperating with the processor, for example.

The pharmacy payment reconciliation device may be configured to determine the predicted claim based upon a machine learning prediction model, for example. The pharmacy payment reconciliation device may be configured to display a corresponding pharmacy claim identifier in a corresponding field with the predicted claim. The pharmacy payment reconciliation device may be configured to display a corresponding provider payment identifier in a corresponding field with the predicted claim, for example.

A method aspect is directed to a method of reconciling pharmacy payments that may include using a pharmacy payment reconciliation device to generate and store electronic historical records of payment data based upon user entry from a paper log of payment data from among a plurality thereof, each paper log associated with payment of pharmacy claims and generated by a respective provider payment device. The method may include using the pharmacy payment reconciliation device to determine a predicted claim for at least one current pharmacy payment based upon the stored electronic historical records of payment data, and display the predicted claim in a field for user entry of a corresponding current payment. The pharmacy payment reconciliation device may also be used to accept one of user confirmation or correction of the predicted claim in the field for user entry of the corresponding current payment to thereby assist the user in entry from the paper log of payment data.

A computer readable medium aspect is directed to a non-transitory computer readable medium for reconciling pharmacy payments including computer executable instructions that when executed by a processor cause the processor to perform operations. The operations may include generating and storing electronic historical records of payment data based upon user entry from a paper log of payment data from among a plurality thereof, each paper log associated with payment of pharmacy claims and generated by a respective provider payment device. The operations may also include determining a predicted claim for at least one current pharmacy payment based upon the stored electronic historical records of payment data, and displaying the predicted claim in a field for user entry of a corresponding current payment. The operations may further include accepting one of user confirmation or correction of the predicted claim in the field for user entry of the corresponding current payment to thereby assist the user in entry from the paper log of payment data.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
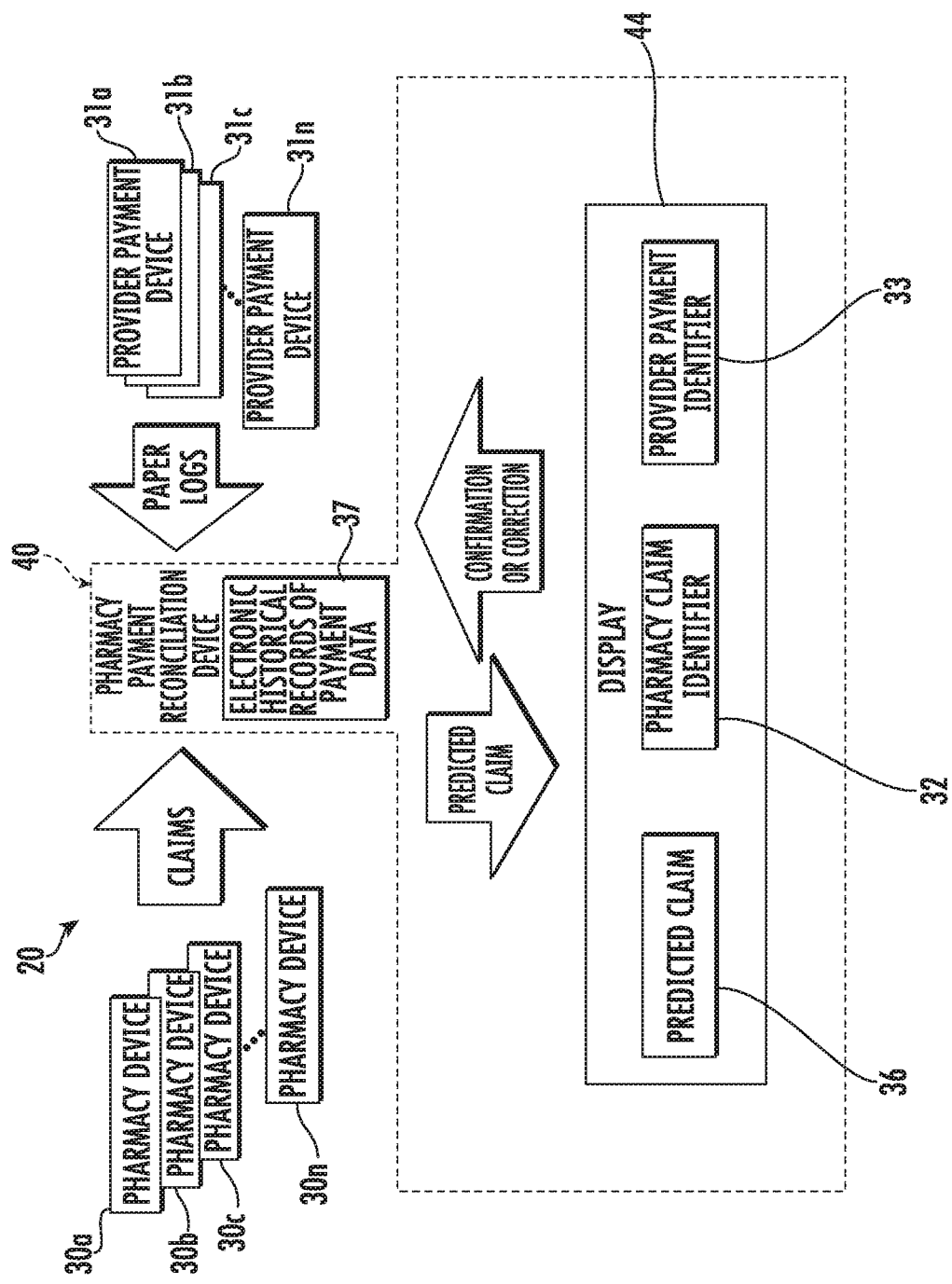
FIG. 1 is a schematic diagram of a system for reconciling pharmacy payments in accordance with an embodiment.
Figure 2:
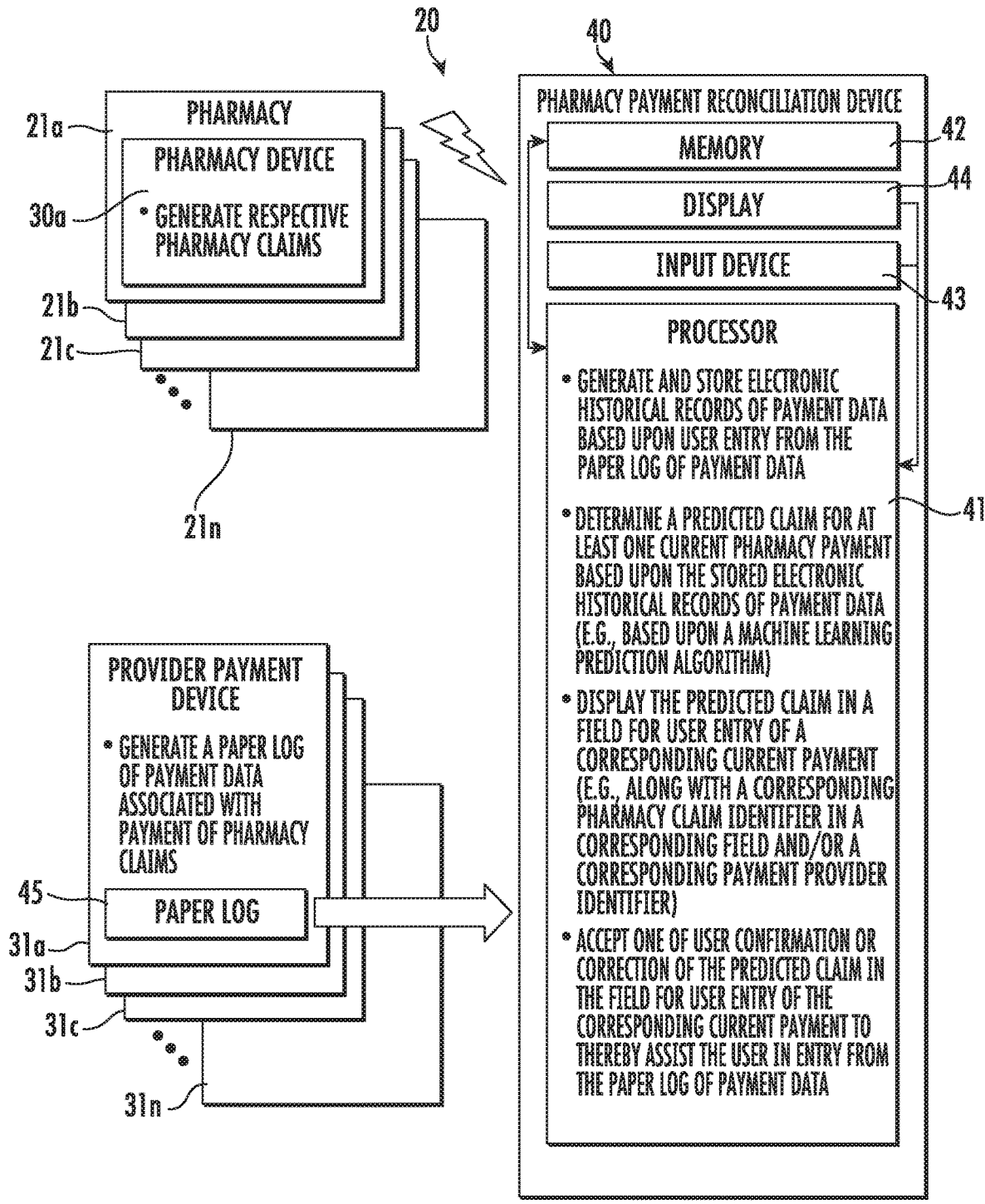
FIG. 2 is a more detailed schematic diagram of the system of FIG. 1.

Referring initially to FIGS. 1 and 2, a system for reconciling pharmacy payments 20 includes pharmacy devices 30a-30n. Each pharmacy device 30a-30n is associated with a respective pharmacy 21a-21n and generates respective pharmacy claims. The pharmacy devices 30a-30n may be in the form of one or more computers at the respective pharmacy 21a-21n, for example. The pharmacy devices 30a-30n may generate the respective pharmacy claims electronically. The respective pharmacy payments may be in the form of an electronic data interchange (EDI) 835 file and may include any of corresponding pharmacy claim identifiers 32, corresponding provider payment identifiers 33, corresponding prescription fill dates 34, and corresponding patient names 35, for example. The pharmacy devices 30a-30n communicate, for example, over one or more networks, such as the Internet, the respective claims to corresponding payment providers for processing of payments of the claims in accordance with payment policies.

Provider payment devices 31a-31n, which may be in the form of computers, servers, or other electronic devices, may generate a paper log of payment data (e.g., explanation of benefits data) associated with the payment of the pharmacy claims. For example, a printer communicatively coupled to the provider payment devices 31a-31n may print the paper logs of the payment data. Those skilled in the art will appreciate that the paper logs include information indicative of which claims and how much the payment providers have paid, if anything. The paper logs may be printed and mailed to the third party associated with a pharmacy payment reconciliation device 40, for example. In some embodiments, the paper logs may be scanned and communicated electronically. As will be appreciated by those skilled in the art, while payment providers may send payment logs electronically, for example, in a known or standardized electronic format, such as EDI835, payment providers may alternatively or additionally send the paper logs to the respective pharmacies 21a-21n or pharmacy devices 30a-30n.

The pharmacy devices 30a-30n also communicate the respective claims to a pharmacy payment reconciliation device 40, which may be associated with a third party (e.g., neither the pharmacy nor the payment provider). The pharmacy payment reconciliation device 40 may be in the form of a computer, such as a personal computer, a server, or other electronic device. The pharmacy payment reconciliation device 40 illustratively includes a processor 41 and a memory 42 cooperating with the processor. The pharmacy payment reconciliation device 40 also includes one or more user input devices 43, such as a keyboard, cooperating with the processor 41.

Figure 3:
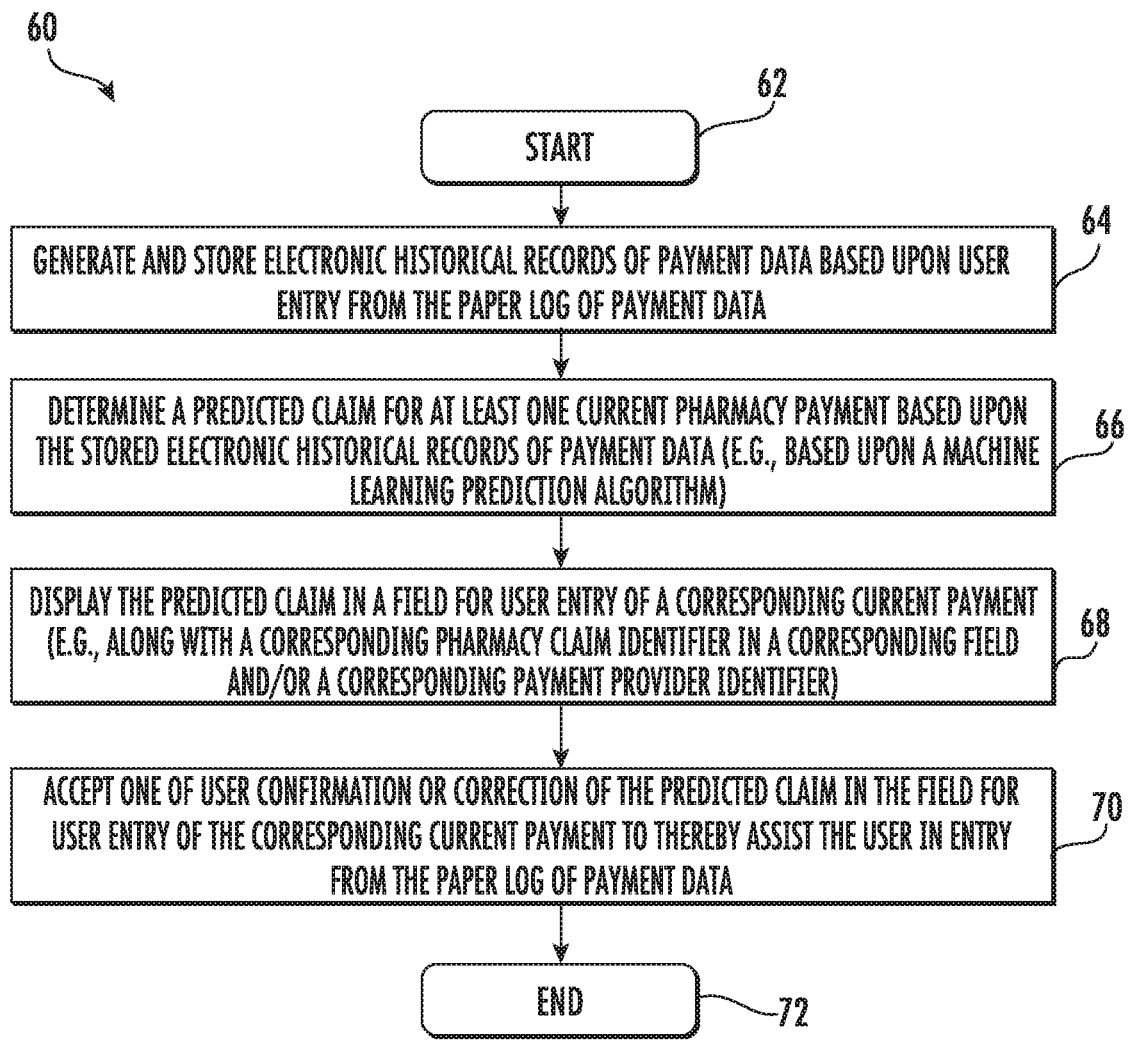
FIG. 3 is a flowchart illustrating operation of the pharmacy payment reconciliation device of FIG. 2.

Referring now additionally to the flowchart 60 in FIG. 3, beginning at Block 62, operation of the pharmacy payment reconciliation device 40 with respect to reconciling pharmacy payments will now be described. It should be understood that while operations of the pharmacy payment reconciliation device 40 are described herein, those operations are performed based upon cooperation between the processor 41 and the memory 42, and other devices such as the input device 43.

At Block 64, the pharmacy payment reconciliation device 40 generates and stores, for example, in the memory 42, electronic historical records of payment data based upon user entry from the paper log of payment data. In other words, payment information may be manually entered via the input device 43 over time (i.e., previously entered) and stored to define the electronic historical records of payment data.

Figure 4:
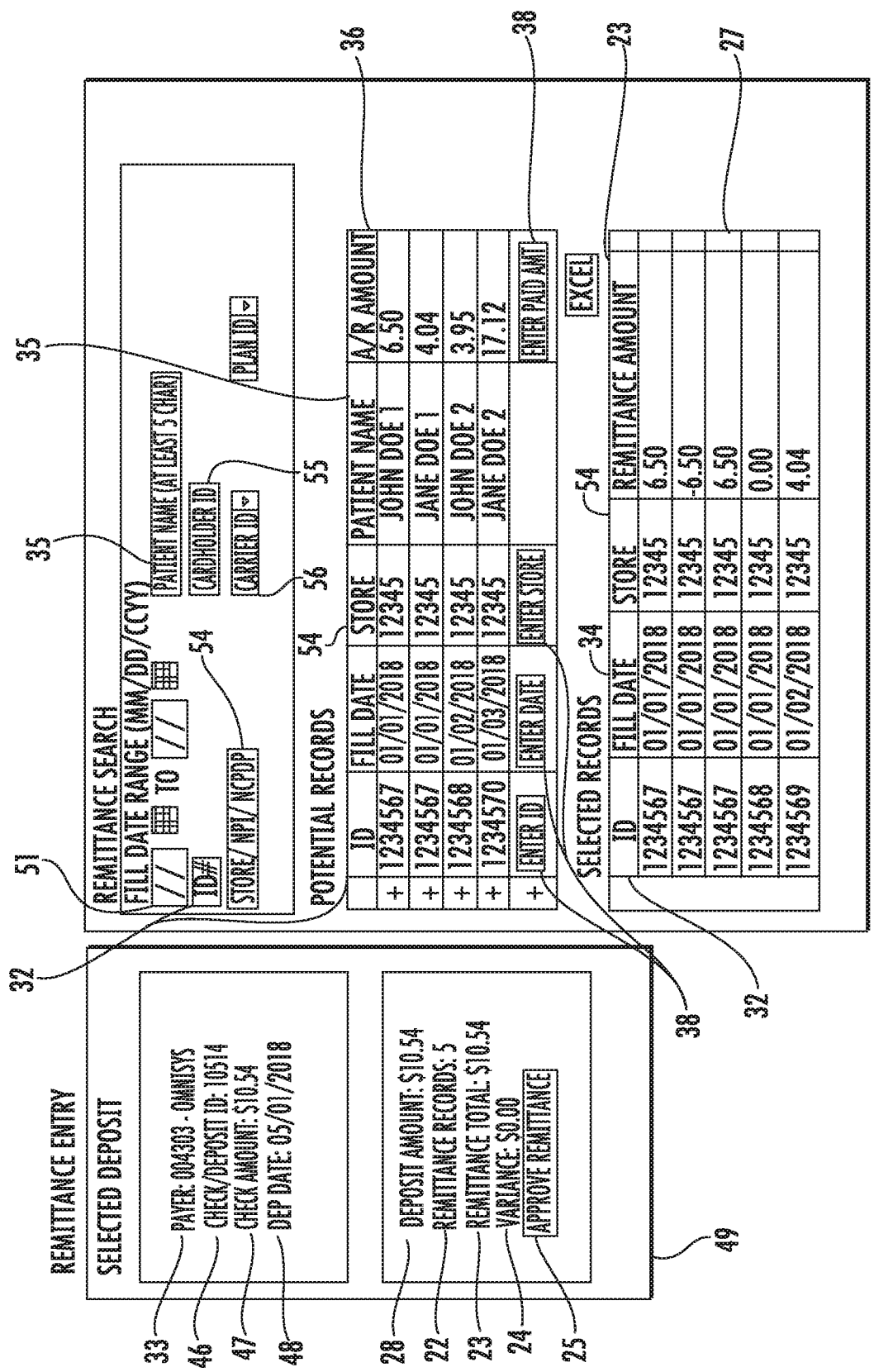
FIG. 4 is an exemplary screen-shot of a display of a pharmacy payment reconciliation device illustrating predicted claims in accordance with an embodiment.

Referring additionally to FIG. 4, a user at the pharmacy payment reconciliation device 40 may be presented on a display 44 a remittance entry screen that permits the user to enter payments or remittance information. For example, the user may have the option of searching for a claim based upon search fields, such as, date range 51, pharmacy or claim submitter identifier 32 (e.g., prescription (Rx) number), patient name 35, store or pharmacy (e.g. store) identifier 54, cardholder identifier 55, provider or carrier identifier 56, and provider plan identifier 57. Of course, other fields may be used as a basis for searching.

The pharmacy payment reconciliation device 40, at Block 66, determines a predicted claim 36 for the current pharmacy payment based upon the stored electronic historical records of payment data 37. The pharmacy payment reconciliation device 40 determines each predicted claim for each payment based upon a machine learning prediction model. In other words, as records of payment data is entered, the processor 41 learns which types of plans, medications, and claims are paid and may more accurately predict, based upon the plan, medication, and claims, what claims are being paid with each new payment. Other and/or additional elements may be considered in the machine learning prediction model, for example, dates, pharmacy identifier, etc.

The pharmacy payment reconciliation device 40 displays, for example, on the display 44, the predicted claim 36 in a field for user entry of a corresponding current payment (Block 68). As described above, the predicted claim with the corresponding pharmacy claim identifier 32, fill date 34, and pharmacy identifier 54, and patient name 35 are displayed in a listing of potential records. In other words, the fields are prepopulated with predicted data representative of what the user will enter.

At Block 70, the pharmacy payment reconciliation device 40 accepts one of user confirmation or correction of the selected payment in the field for user entry of the corresponding current payment to thereby assist the user in entry from the paper log of payment data 45. More particularly, for example, a selected payment 49 or deposit/remittance may be appear on the display 44 with provider payment identifier 33, a check identifier 46, a check amount 47, and deposit date 48. This information is typically manually entered. The selected payment or deposit information 49 may also include a remittance or deposit account 28 (which may be equal to the check amount 47), an amount of remittance records 22, remittance total 23, and variance 24. If the pharmacy payment reconciliation device 40 accurately predicted the predicted claim 36 for a current payment, then the record matches the current payment 24. In one embodiment, the user may accept the predicted claim information via the input device 43 providing input to an "Approve Remittance" input 25 on the display 44. The selected deposit 49 may be matched to or from among selected records 27 that include a pharmacy claim identifier or prescription number 32, fill date 34, pharmacy identifier 54, and remittance total 23, for example.

If, for example, there is a discrepancy, the user may correct, for example, manually the selected payment and/or other fields. An updated or corrected payment or record may be accepted as described above. New records may also be entered based upon input to any corresponding blank fields 38 that prompt for entry of data. Operations end at Block 72.

As will be appreciated by those skilled in the art, the pharmacy payment reconciliation device 40 assists the user in entry from the paper log of payment data 45. A current approach involves manually entering the payment data and then matching the payment data to the data from the received electronic claims. Due to the relatively high volume of data being entered by the user, there is an increased chance of errors. For example, a claim may be marked as paid when it was not and vice versa. Also, a claim may be marked erroneously as being paid more or less than the claimed amount. Other techniques, for example, optical character recognition (OCR) may be cost prohibitive and generally requires setting up each format of paper remittance received in the process.

The system 20 described herein, and more particularly, the pharmacy payment reconciliation device 40 advantageously reduces the amount of data being input by the user and thus reduces the chances of or amount of error. Indeed, the predicted claim 36 and pre-population of the fields may reduce input of the user in some instances to merely input of acceptance or selection. In other words, the system 20 operates as a prediction tool that looks for posted pharmacy claims in the pharmacy payment reconciliation device 40 and uses the claims data returned to help in the process of capturing payment/remittance records to thereby reduce or avoid having to key each individual field of data.

Referring particularly to FIG. 4, in the potential records section, claim records provided by the pharmacy devices 30a-30n are retrieved or provided to the pharmacy payment reconciliation device 40. The potential records section is populated with claims based upon the above-described prediction and/or by using the search filters from the remittance search section. When a data entry user or keyer, for example, determines that a claim presented in the potential records section matches what is being paid for on the paper remittance, the keyer selects the claim which subsequently populates the same fields of data into the selected records section. The selected records section would thus be considered payment remittance though it was initially data pulled from claims. When a keyer selects a claim to move to the selected records section, the keyer then confirms or correct the details populated in selected records section to match the actual paper remittance.

For example, as illustrated, the paper remittance indicates that ID 1234567 paid three times, once for 6.50, then for −6.50 (reversal payment), and then again for 6.50. The single claim record for ID 1234567 is selected 3 times in the potential records section, which subsequently creates three remittance records in the selected records section, all initially for +6.50, matching the claim that was identified in the prediction or potential records. The user or keyer would confirm the first and third records in the selected records section, but would ultimately need to correct the second record to be −6.50 to match the record on the paper document. Thus, in selecting the claim record to generate the remittance records, the keyer or user only selected the claim three times and corrected one field in the selected records section as opposed to keying twelve individual fields of data by hand, taking more time and risking keying errors.

A method aspect is directed to a method of reconciling pharmacy payments that includes using a pharmacy payment reconciliation device 40 to generate and store electronic historical records of payment data 37 based upon user entry from a paper log of payment data 45 from among a plurality thereof, each paper log associated with payment of pharmacy claims and generated by a respective provider payment device 31a-31n. The method includes using the pharmacy payment reconciliation device 40 to determine a predicted claim 36 for at least one current pharmacy payment based upon the stored electronic historical records of payment data 37, and display the predicted claim in a field for user entry of a corresponding current payment 23. The pharmacy payment reconciliation device 40 is also used to accept one of user confirmation or correction of the predicted claim 36 in the field for user entry of the corresponding current payment 23 to thereby assist the user in entry from the paper log of payment data 45.

A computer readable medium aspect is directed to a non-transitory computer readable medium for reconciling pharmacy payments comprising computer executable instructions that when executed by a processor 41 cause the processor to perform operations. The operations include generating and storing electronic historical records of payment data 37 based upon user entry from a paper log of payment data 45 from among a plurality thereof, each paper log associated with payment of pharmacy claims and generated by a respective provider payment device 31a-31n. The operations also include determining a predicted claim 36 for at least one current pharmacy payment based upon the stored electronic historical records of payment data 37, and displaying the predicted claim in a field for user entry of a corresponding current payment 23. The operations further include accepting one of user confirmation or correction of the predicted claim 36 in the field for user entry of the corresponding current payment 23 to thereby assist the user in entry from the paper log of payment data 45.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for reconciling pharmacy payments comprising:
a plurality of pharmacy devices, each associated with a respective pharmacy and configured to generate respective pharmacy claims in an electronic data interchange (EDI) file format;
a plurality of provider payment devices, each configured to obtain the respective pharmacy claims in the EDI file format and cooperate with a printer communicatively coupled thereto to generate a paper log of payment data associated with payment of the pharmacy claims; and
a pharmacy payment reconciliation device comprising a display, an input device, memory, and a processor coupled to the display, input device, and memory, the processor configured to generate and store in the memory electronic historical records of payment data based upon manual user entry from the paper log of payment data,
predict, using a machine learning prediction model, a given predicted claim from a plurality of predicted claims for a corresponding current pharmacy payment from among a plurality of current pharmacy payments, the processor operating the machine learning prediction algorithm to learn which types of plans, medications, and pharmacy claims are paid to predict, based upon types of plans, medications, and pharmacy claims, what claims are being paid with each new payment, determine the plurality of predicted claims for the plurality of current pharmacy payments based upon the stored historical records and payment data,
display, on a display, the plurality of predicted claims each by prepopulating the field with predicted data representative of what the user will enter in the field,
display, on the display, the plurality of current pharmacy payments, the plurality of current pharmacy payments each corresponding to an actual payment,
display, on the display adjacent the plurality of predicted claims, a selected deposit representative of one of the plurality of current pharmacy payments for matching to the predicted claim and to a corresponding actual payment from the displayed plurality of current pharmacy payments, and accept one of a user confirmation based upon a match between the predicted claim to the corresponding actual payment in the field or a user correction of the predicted claim in the field for user entry of the corresponding current pharmacy payment via the input device and, based upon the user confirmation or correction, train the machine learning prediction model to predict the types of plans, medication, and pharmacy claims, which claims are being paid with each new payment.

2. The system of claim 1 wherein the pharmacy payment reconciliation device is configured to display a corresponding pharmacy claim identifier in a corresponding field with the predicted claim.

3. The system of claim 1 wherein the pharmacy payment reconciliation device is configured to display a corresponding provider payment identifier in a corresponding field with the predicted claim.

4. A pharmacy payment reconciliation device comprising:
a display;
an input device;
a memory; and
a processor cooperating with the memory to generate and store in the memory electronic historical records of payment data based upon manual user entry from a paper log of payment data from among a plurality thereof, each paper log associated with payment of pharmacy claims and generated by a respective provider payment device configured to obtain respective ones of the pharmacy claims in an electronic data interchange (EDI) file format from respective ones of a plurality of pharmacy devices and cooperate with a printer communicatively to generate the paper log, predict, using a machine learning prediction model, a given predicted claim from a plurality of predicted claims for a corresponding current pharmacy payment from among a plurality of current pharmacy payments, the processor operating the machine learning prediction model to learn which type of plans, medications, and pharmacy claims are paid to predict, based upon the types of plans, medications, and pharmacy claims, what claims are being paid with each new payment, determine the plurality of predicted claims for the plurality of current pharmacy payments based upon the stored historical records and payment data, display, on a display, the plurality of predicted claims in a field for user entry by prepopulating the field with predicted data representative of what the user will enter in the field, display, on the display, the plurality of current pharmacy payments, the plurality of current pharmacy payments each corresponding to an actual payment, display, on the display adjacent the plurality of predicted claims, a selected deposit representative of one of the plurality of current pharmacy payments for matching to the predicted claim and to a corresponding actual payment from the displayed plurality of current pharmacy payments, and accept one of a user confirmation based upon a match between the predicted claim to the corresponding actual payment in the field or a user correction of the predicted claim in the field for user entry of the corresponding current pharmacy payment via the input device and, based upon the user confirmation or correction, train the machine learning prediction model to predict the types of plans, medication, and pharmacy claims, which claims are being paid with each new payment.

5. The pharmacy payment reconciliation device of claim 4 wherein the processor and memory cooperate to display at least one of a corresponding pharmacy claim identifier in a corresponding field with the predicted claim and a corresponding provider payment identifier in a corresponding field with the predicted claim.

6. A method of reconciling pharmacy payments comprising:
using a pharmacy payment reconciliation device comprising a display, an input device, memory, and a processor coupled to the display, input device, and memory, to
generate and store in the memory electronic historical records of payment data based upon manual user entry from a paper log of payment data from among a plurality thereof, each paper log associated with payment of pharmacy claims and generated by a respective provider payment device configured to obtain respective ones of the pharmacy claims in an electronic data interchange (EDI) file format from respective ones of a plurality of pharmacy devices and cooperate with a printer communicatively to generate the paper log, predict, using a machine learning prediction model, a given predicted claim from plurality of predicted claims for a corresponding current pharmacy payment from among a plurality of current pharmacy payments, the processor operating the machine learning prediction model to learn which types of plans, medications, and pharmacy claims are paid to predict, based upon the types of plans, medications, and pharmacy claims, what claims are being paid with each new payment, determine the plurality of predicted claims for the plurality of current pharmacy payments based upon the stored historical records and payment data, display, on a display, the plurality of predicted claims each by prepopulating the field with predicted data representative of what the user will enter in the field, display, on the display, the plurality of current pharmacy payments, the plurality of current pharmacy payments each corresponding to an actual payment, display, on the display adjacent the plurality of predicted claims, a selected deposit representative of one of the plurality of current pharmacy payments for matching to the predicted claim and to a corresponding actual payment from the displayed plurality of current pharmacy payments, and accept one of a user confirmation based upon a match between the predicted claim to the corresponding actual payment in the field or a user correction of the predicted claim in the field for user entry of corresponding current pharmacy payment via the input device and, based upon the user confirmation or correction, train the machine learning prediction model to the types of plans, medication, and pharmacy claims, which claims are being paid with each new payment.

7. The method of claim 6 wherein using the pharmacy payment reconciliation device comprises using the pharmacy payment reconciliation device to display a corresponding pharmacy claim identifier in a corresponding field with the predicted claim.

8. The method of claim 6 wherein using the pharmacy payment reconciliation device comprises using the pharmacy payment reconciliation device to display a corresponding provider payment identifier in a corresponding field with the predicted claim.

9. A non-transitory computer readable medium for reconciling pharmacy payments comprising computer executable instructions that when executed by a processor of a pharmacy payment reconciliation device comprising a display, an input device, and memory coupled to the processor, cause the processor to perform operations comprising:

generating and storing in the memory electronic historical records of payment data based upon user entry from a paper log of payment data from among a plurality thereof, each paper log associated with payment of pharmacy claims and generated by a respective provider payment device configured to obtain respective ones of the pharmacy claims in an electronic data interchange (EDI) file format from respective ones of a plurality of pharmacy devices and cooperate with a printer communicatively to generate the paper log;

predicting, using a machine learning prediction model, a given predicted claim from among a plurality of predicted claims for a corresponding current pharmacy payment from among a plurality of current pharmacy payments, the processor operating the machine learning prediction model to learn which types of plans, medications, and pharmacy claims are paid to predict, based upon the types of plans, medications, and pharmacy claims, what claims that are being paid with each new payment;

determining the plurality of predicted claims for the plurality of current pharmacy payments based upon the stored historical records and payment data;

displaying, on a display, the plurality of predicted claims each in a field for user entry by prepopulating the field with predicted data representative of what the user will enter in the field;

displaying, on the display, the plurality of current pharmacy payments, the plurality of current pharmacy payments each corresponding to an actual payment;

displaying, on the display adjacent the plurality of predicted claims, a selected deposit representative of one of the plurality of current pharmacy payments for matching to the predicted claim and to a corresponding actual payment from the displayed plurality of current pharmacy payments; and accepting one of a user confirmation based upon a match between the predicted claim to the corresponding actual payment in the field or a user correction of the predicted claim in the field for user entry of the corresponding current pharmacy payment via the input device and, based upon the user confirmation or correction, train the machine learning prediction model to predict the types of plans, medication, and pharmacy claims, which claims are being paid with each new payment.

10. The non-transitory computer readable medium of claim 9 wherein the operations comprise displaying a corresponding pharmacy claim identifier in a corresponding field with the predicted claim.

11. The non-transitory computer readable medium of claim 9 wherein the operations comprise displaying a corresponding provider payment identifier in a corresponding field with the predicted claim.

* * * * *